United States Patent
Ogden

[11] 3,783,623
[45] Jan. 8, 1974

[54] FISH ESCALATOR
[76] Inventor: Stanley E. Ogden, P.O. Box 618, Mill City, Oreg. 97362
[22] Filed: Feb. 8, 1972
[21] Appl. No.: 224,509

[52] U.S. Cl. .................................................. 61/21
[51] Int. Cl. ............................................ E02b 8/08
[58] Field of Search ...................................... 61/21

[56] References Cited
UNITED STATES PATENTS

| | | | |
|---|---|---|---|
| 1,579,105 | 3/1926 | Green | 61/21 |
| 2,071,670 | 2/1937 | Warner | 61/21 |
| 1,380,384 | 6/1921 | Howard | 61/21 |
| 1,722,596 | 7/1929 | Ross | 61/21 |
| 1,903,627 | 4/1933 | Koch | 61/21 |
| 2,683,969 | 7/1954 | Mugnier | 61/21 |
| 2,922,282 | 1/1960 | Dohrer | 61/21 |

Primary Examiner—Mervin Stein
Assistant Examiner—Philip C. Kannan
Attorney—Harvey B. Jacobson et al.

[57] ABSTRACT

An enclosed endless conveyor-type fish elevator for carrying fish upstream over or through a dam. The elevator includes a pair of parallel tubular passageways having one set of identical corresponding transverse dimensions and a second set of different corresponding dimensions. An endless chain is disposed at each pair of corresponding sides of the passageways and each chain is arranged in generally parallel reaches with one reach extending along the mid-point of the adjacent side of one of the passageways and the other reach of the chain extending midway along the adjacent side of the other passageway. Corresponding reaches of the chains have partition members secured therebetween and the partition members are mounted in such a manner as to be at least slightly oscillatable and urged into tight sliding engagement with the associated passageways by means of tension of the endless chains. The passageway having the smaller cross-sectional area comprises the elevating passageway for elevating fish to the higher level and the passageway having the greater cross-sectional area comprises the return passageway or means for lowering fish to the lower level. In this manner, a greater downward thrust is applied to the partition members in the return passageway by the head pressure of water acting upon the upstream side of the partitions disposed in the return passageway than the pressure exerted by head pressure in the fish elevating passageway and the elevator thereby works somewhat in the manner of an undershot waterwheel with means being provided to admit fish to be elevated to the higher level or lowered to the lower level into the compartments defined between adjacent partition members.

6 Claims, 10 Drawing Figures

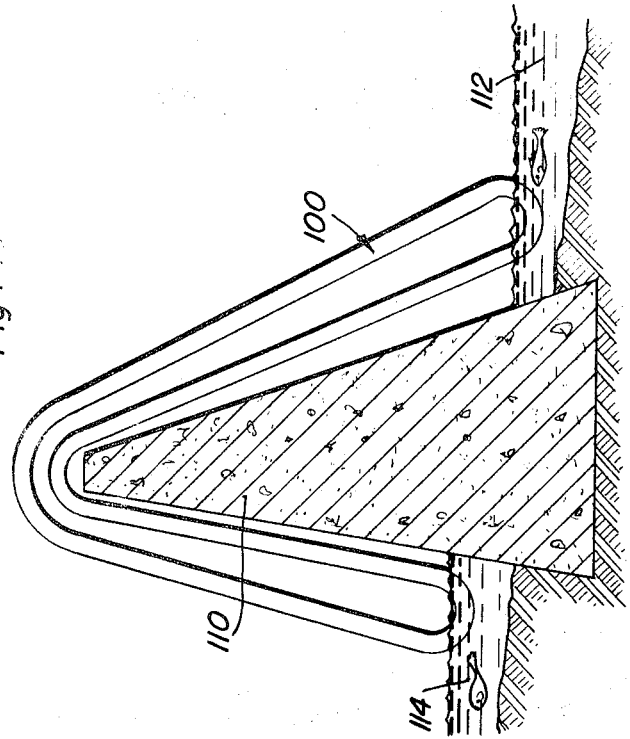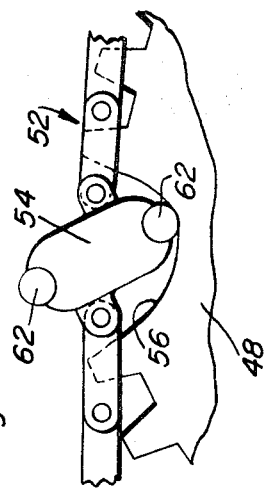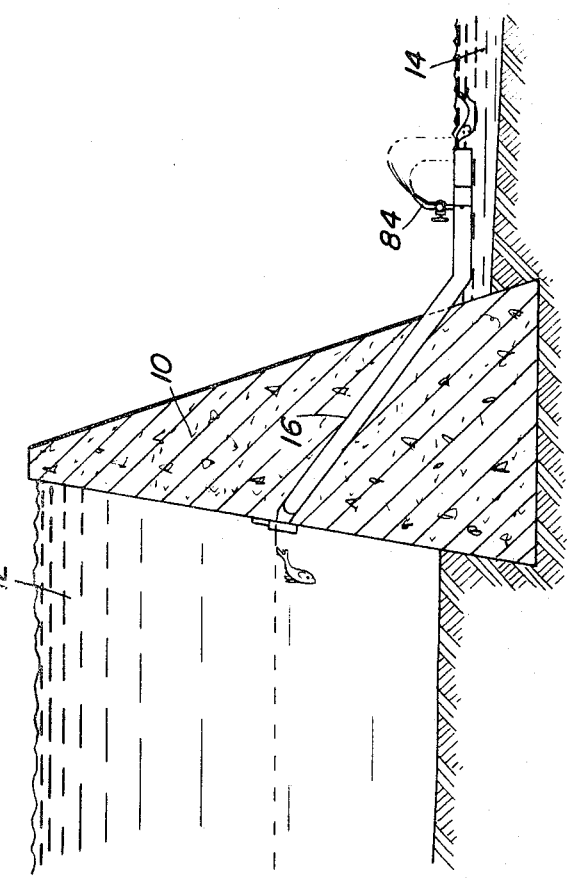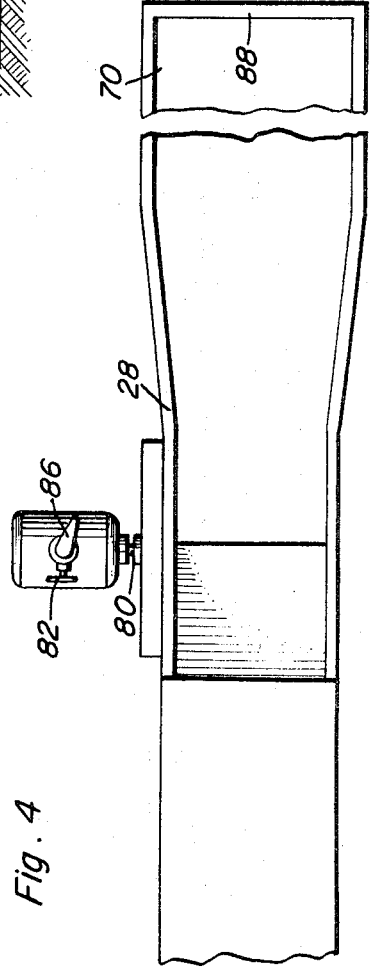

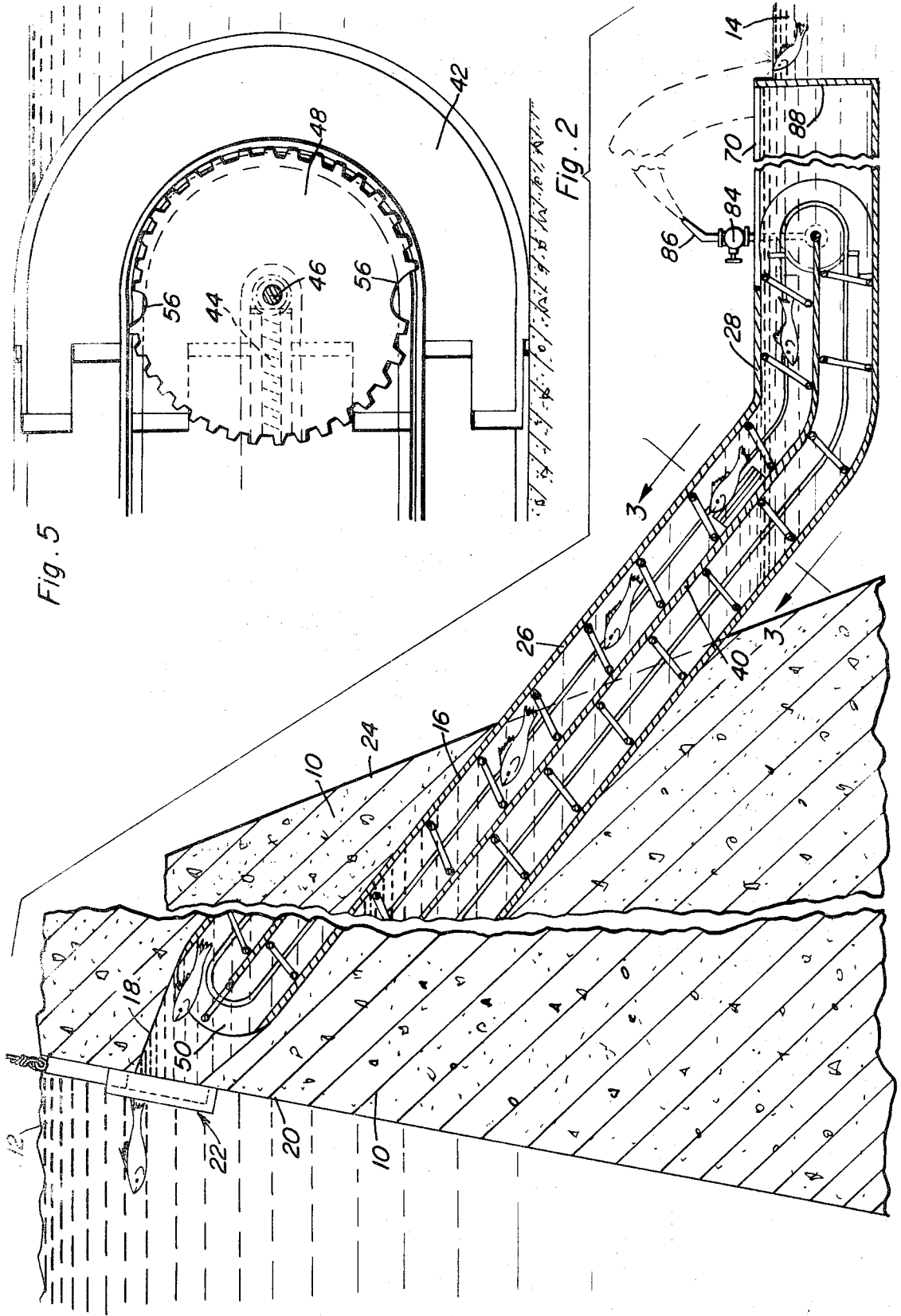

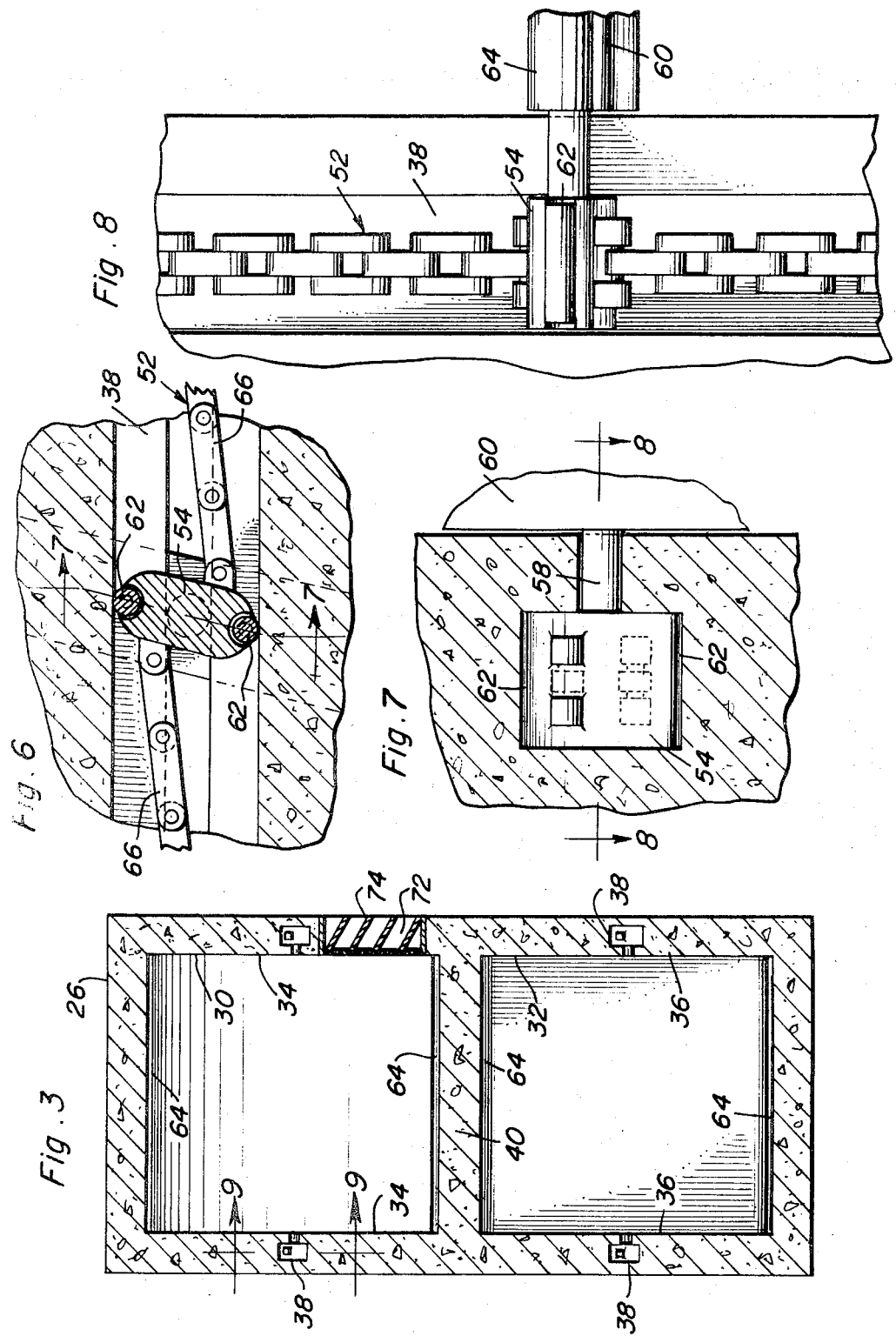

FISH ESCALATOR

The fish elevator or escalator of the instant invention has been designed to provide a means whereby fish may be passed through, over or around a dam, in either direction without requiring an outside source. Further, by the construction of the escalator it may be utilized to generate power in addition to elevating fish and it is envisioned that the elevator may have its basic operational features incorporated into various different forms of fish elevators.

The main object of this invention is to provide a fish elevator or escalator in order to pass fish over or through a dam and thereby maintain their way of life and propagation.

Another object of this invention is to provide an escalator in accordance with the preceding objects which will be and which may, in fact, be used to generate power fully without requiring an outside source of power.

Yet another object of this invention is to provide an escalator in accordance with the preceding objects that may be readily incorporated into dams being presently built as well as added to existing dams.

Still another object of this invention is to provide a fish escalator which may be readily adjusted to determine its speed of operation.

A final object of this invention to be specifically enumerated herein is to provide a fish escalator which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a sectional view taken through a dam with the fish escalator of the instant invention operatively associated with the dam for moving fish through the dam, both by escalation from the downstream side of the dam, through the dam and into the water at a higher elevation on the upstream side of the dam, and by de-escalation from the upstream side of the dam, through the latter and into the water at the lower elevation on the downstream side of the dam.

FIG. 2 is an enlarged fragmentary sectional view of the dam and the fish escalator;

FIG. 3 is an enlarged transverse sectional view taken substantially upon the plane indicated by the section line 3-3 of FIG. 2;

FIG. 4 is a top plan view of the lower downstream end of the fish escalator;

FIG. 5 is a fragmentary side elevational view of one side of the lower end of the escalator as seen from the inside thereof and illustrating the manner in which the lower sprocket wheels of the escalator may be adjusted in order to control the tension of the partition member supporting chains of the escalator;

FIG. 6 is a fragmentary vertical sectional view illustrating the manner in which the partition members are supported from the endless chains of the escalator;

FIG. 7 is a transverse sectional view taken substantially upon the plane indicated by the section line 7—7 of FIG. 6;

FIG. 8 is a sectional view taken substantially upon the plane indicated by the section line 8—8 of FIG. 7;

FIG. 9 is a fragmentary side elevational view illustrating the manner in which the chains of the fish escalator are engaged with the sprocket wheels of the escalator at the points along the chains from which the partition members of the escalator are supported; and FIG. 10 is a vertical sectional view similar to FIG. 1 but illustrating a modified form of fish escalator adapted to elevate fish completely over the upper marginal portion of a dam.

Referring now more specifically to the drawings, the numeral 10 generally designates a dam behind which a body 12 of water is contained. A second lower body 14 of water is disposed on the downstream side of the dam and the latter has an upwardly inclined passageway 16 formed therethrough.

The upper end of the passageway 16 is necked down as at 18 and opens through the rear face 20 of the dam 10 through a control gate assembly referred to in general by the reference numeral 22 which may be closed when desired.

The lower end of the passage 16 is continued outwardly of the front face 24 of the dam 10 by means of a tubular inclined extension 26 terminating at its lower end in a horizontally directed portion 28.

The passageway 16 and extension 26 define a pair of parallel passages 30 and 32 which are rectangular in cross-section and vertically spaced relative to each other with the passage 30 disposed above the passage 32, see FIG. 3.

The width of the passages 30 and 32 is identical. However, the height of the passage 30 is at least slightly less than the height of the passage 32 and the side walls 34 of the passage 30 as well as the side walls 36 of the passage 32 have inwardly opening longitudinally extending T-shaped grooves 38 formed therein.

The passages 30 and 32 are separated by means of a dividing wall 40 extending substantially throughout the length of the passage 16 and throughout the length of the extension 26.

The terminal ends of the side walls of the horizontally directed portion 28 are guidingly supported for shifting longitudinally of the horizontally directed portion 28 and referred to by the reference numerals 42. The terminal ends 42 are adjustable in position by means of jack screws 44 connected between the terminal ends 42 and the associated side walls and a transverse shaft 46 is journaled between the terminal ends 42 and carries a pair of opposite end sprocket wheels 48 thereon. In addition, a similar pair of sprocket wheels 50 are journaled from the dam 10 adjacent the upper end of the passageway 16.

A pair of endless chain assemblies 52 are trained over the sprocket wheels 48 and 50 and each chain assembly includes a plurality of mounting links 54 spaced therealong seatingly engageable with specific teeth 56 carried by the associated sprocket wheels 48 and 50. The mounting links 54 of the chain assemblies 52 are transversely aligned with each other and each pair of aligned mounting links 54 supports a pair of inwardly directed stub shafts 58 between whose adjacent ends a partition member 60 disposed in the corresponding passage is mounted. The stub shafts 58 are closely slidingly received through the narrow portions of the grooves 38 and the mounting links 54 include captive rollers 62 which are rollingly engaged with the upper and lower surfaces of the wide part of the corresponding groove 38. It is to be noted that the lower grooves 38 are slightly wider, from top to bottom, than the wider parts of the upper grooves 38 and therefore that while the partitions 60 in the passage 32 are substantially disposed at right angles to the centerline of the passage 32, the partitions 60 disposed in the passage 30 are more inclined. Of course, the ratio of the difference in the height of the passages 30 and 32 is substantially equal to the difference in the distances between the surfaces of the grooves 38 engaged by the rollers 62.

The upper and lower edge portions of the partitions 60 have captive rollers 64 journaled therefrom which are similar to the rollers 62 and thus the rollers 64 are rollingly engaged with the upper and lower surfaces of the passages 30 and 32.

With attention now invited more specifically to FIGS. 6 and 9 of the drawings, it will be seen that the mounting links 54 are secured in the chain assembly 52 between adjacent chain sections 66 thereof in a manner such that tensioning of the chain assembly 52 will tend to maintain the rollers 64 in tight rolling engagement with the upper and lower surfaces of the passages 30 and 32 and the rollers 62 of the mounting links 54 in tight rolling engagement with the upper and lower surfaces of the grooves 38.

After the desired tension of the chain assemblies 52 has been adjusted by shifting the terminal ends 42, the gate assembly 22 may be opened in order to admit water from the body 12 into the upper end of the passageway 16. The head pressure will be the same within the two passages 30 and 32. The force acting upon the partitions 6 in the lower passage 32 with the greater cross sectional area will be greater than the force acting upon the partitions 60 in the upper passage 30 with the lesser cross sectional area and thus the chain assemblies 52 will be caused to orbit in a counterclockwise direction as viewed in FIG. 2 of the drawings.

The horizontally directed portion 28 has a portion of its top wall removed so as to define an upper opening 70 and fish may jump from the body 14 into the water within the horizontally directed portion 28 through the opening 70. Inasmuch as the chain assemblies 52 are orbiting in a counterclockwise direction, some of the fish will be trapped adjacent partitions 60 in the passage 30 and conveyed upwardly to the upper end of the passageway 16 and swim out through the gate assembly 22 into the body 12 at the higher level. It will of course be impossible for fish in the lower horizontally directed portion 28 to move upwardly through the passage 32 inasmuch as the partitions 60 therein are moving downwardly therethrough. While some fish which are discharged from the upper end of the passage 30 may find their way down into the upper end of the lower passage 32, most of the fish will swim against the flow of water entering the upper end of the passage 16 and thus exit from the dam 10 through the gate assembly 20 and into the body 12 of water.

In order to further increase the efficiency and possible power output of the escalator, outlet openings 72 having grille assemblies 74 secured thereover are formed in the side walls of the lower end of the extension 26 whereby at least some of the water between adjacent partitions 60 may be vented therefrom. This of course will greatly reduce the total amount of weight of water being lifted upwardly through the passage 30 between adjacent partitions 60 and thus increase the efficiency or power output of the escalator.

One end of the shaft 46 projects outwardly through the corresponding side wall of the horizontally directed portion 28 as at 80 and drives a water pump 82 which pumps water through a throttle and/or shut-off valve 84 operable to cause a resistance to the flow of the water acting as a controlable resistance force against the force of the partitions 60 thus controlling the speed of orbit of the partitions 60. The valve 84 includes a discharge nozzle 86 operative to spray a jet of water up into the air for falling into the open part of the horizontally directed portion 28 and the adjacent portion of the body 14 of water. This falling of water and the spent or excess water from the escalator will attract fish and induce the latter to jump over the lower end wall 88 of the horizontally directed portion 28 and into the latter for movement into the passage 32.

Further, and especially when the drain openings 72 are utilized, the shaft end 80 may also be utilized to drive an electric generator in order that useful power may also be developed from the escalator.

With attention now invited more specifically to FIG. 10 of the drawings, there may be seen a modified form of escalator referred to in general by the reference numeral 110 and which is generally similar to the escalator illustrated in FIGS. 1 through 9, but differs in that the two reaches of the chain assemblies 52 are supported from an elongated housing which curves up and over a dam 110 corresponding to the dam 10. The inlet end of the escalator 100 is of course open at its lower part within the body 112 of water below the dam 110 and the outlet end of the escalator 100 is open at its lower portion in the body 114 of water upstream from the dam 110. Otherwise, the operation of the escalator 100 is substantially identical to the operation of the escalator illustrated in FIGS. 1 through 9, excepting that the escalator 100 operates more on the principle of a siphon rather than an undershot waterwheel.

The foregoing is considered as illustrative only of the principles of the invention. Further, since numerous modifications and changes will readily occur to those skilled in the art, it is not desired to limit the invention to the exact construction an operation shown and described, and accordingly all suitable modifications and equivalents may be resorted to, falling within the scope of the invention.

I claim:

1. In combination with a dam including upstream and downstream sides and with which high and low water levels, respectively, are operatively associated, means establishing first and second closed communication passages between a high elevation on the upstream side of said dam and a lower elevation on the downstream side of said dam and including adjacent corresponding upper and lower ends, said passages including means operative to convey water and objects suspended therein through said first passage at a first rate from said upstream side of said dam to said downstream side and through said second passage at a second lower rate from said downstream side to said upstream side, said first passage being of greater cross-sectional area than said second passage, said means operative to convey water being wholly gravity operated and comprising a plurality of spaced interconnected imperforate partitions connected together for simultaneous movement in train fashion and supported for guided downward movement through said first passage and subsequent upward movement through said second passage, said partitions including peripheral edges in fluid seal forming engagement with the walls of said passages, whereby the conveying of water and fish past said dam in both directions may be effected without the use of an outside power source, said passages establishing closed communication with the upstream side of said dam below said high water level.

2. In combination with a dam including upstream and downstream sides, a fish escalator comprising means defining an elongated passage including an inlet end disposed at a low elevation on the downstream side of the dam and an outlet end disposed at a higher elevation on the upstream side of the dam, a plurality of partitions supported from said passage defining means for movement through said passage in substantially constant spaced relation relative to each other and in at least reasonably good fluid sealing relation with the surfaces defining said passage, and means connected to said partitions for causing said partitions to move into the inlet end of said passage, through the latter and out of the outlet end of said passage, said means defining said passage including means defining opposite side grooves extending along the opening into said passage, said means causing said partitions to move through said passage comprising flexible tension members extending through said lengthwise shiftable in said grooves, said partitions including opposite side portions thereof joined to corresponding portions of said tension members, said flexible tension members comprising corresponding reaches of a pair of endless flexible tension members, said fish escalator also including means defining a second passage generally paralleling the first-mentioned passage and through which said partitions are lengthwise movable, said second passage also including opposite side grooves in which second reaches of said endless flexible tension members are disposed, said means defining said passages including pairs of guide wheels at the corresponding ends of said passages and about which said endless tension members are trained, the ends of said second passage corresponding to the inlet and outlet ends of said first passage opening outwardly of said downstream and upstream sides of said dam, said passages being of substantially the same width, the transverse dimension of said first passage measured at 90° relative to the width thereof being slightly less than the corresponding transverse dimension of the second passage, said partition members being slightly inclined relative to transverse planes extending through said passages normal to the longitudinal centerlines thereof, the partitions in said first-mentioned passage being inclined more greatly relative to the corresponding transverse planes than the partitions in said second mentioned passage.

3. The combination of claim 2 wherein the downstream ends of said passages open into an upwardly opening compartment defined by upstanding wall portions including at least one upper marginal edge portion disposed at an elevation approximately equal to the water level on the downstream side of said dam.

4. The combination of claim 3 wherein said upper marginal portion is elevated at least slightly after the water level on said downstream side of said dam.

5. The combination of claim 4 including average water levels on the upstream and downstream sides of said dam, the outlet end of said passage being disposed below the water level on said upstream side of said dam and said inlet end of said passage being disposed below the water level on the downstream side of said dam.

6. In combination with a dam including upstream and downstream sides, a fish escalator comprising means defining an elongated passage including an inlet end disposed at a low elevation on the downstream side of the dam and an outlet end disposed at a higher elevation on the upstream side of the dam, a plurality of partitions supported from said passage defining means for movement through said passage in substantially constant spaced relation relative to each other and in at least reasonably good fluid sealing relation with the surfaces defining said passage, and means connected to said partitions for causing said partitions to move into the inlet end of said passage, through the latter and out the outlet end of said passage, said means defining said passage including means defining opposite side grooves extending along and opening into said passage, said means causing said partitions to move through said passage comprising flexible tension members extending through and lengthwise shiftable in said grooves, said partitions including opposite side portions thereof joined to corresponding portions of said tension members, said flexible tension members comprising corresponding reaches of a pair of endless flexible tension members, said fish escalator also including means defining a second passage generally paralleling the first-mentioned passage and through which said partitions are lengthwise movable, said second passage also including opposite side grooves in which second reaches of said endless flexible tension members are disposed, said means defining said passages including pairs of guide wheels at the corresponding ends of said passages and about which said endless tension members are trained, the ends of said second passage corresponding to the inlet and outlet ends of said first passage opening outward of said downstream and upstream sides of said dam, said passages being of substantially the same width, the transverse dimension of said first passage measured at 90° relative to the width thereof being slightly less than the corresponding transverse dimension of the second passage, said partition members being slightly inclined relative to transverse planes extending through said passages normally to the longitudinal centerlines thereof, the partitions in said first-mentioned passage being inclined more greatly relative to the corresponding transverse planes than the partitions in said second-mentioned passage, means supporting said wheels from said passage-defining means for shifting at least one pair of said wheels relative to the other pair of said wheels in order to adjust the tension of said endless tension members.

* * * * *